(12) United States Patent
Ozaki (10) Patent No.: US 9,410,306 B2
(45) Date of Patent: Aug. 9, 2016

(54) HYDRAULIC EXCAVATOR (71) Applicant: KOMATSU LTD., Tokyo (JP)

(72) Inventor: Tomoaki Ozaki, Komatsu (JP)

(73) Assignee: KOMATSU LTD., Tokyo (JP)

( * ) Notice: Subject to any disclaimer, the term of this patent is extended or adjusted under 35 U.S.C. 154(b) by 0 days.

(21) Appl. No.: 14/398,512

(22) PCT Filed: Aug. 8, 2014

(86) PCT No.: PCT/JP2014/071026
§ 371 (c)(1),
(2) Date: Nov. 3, 2014

(87) PCT Pub. No.: WO2016/021046
PCT Pub. Date: Feb. 11, 2016

(65) Prior Publication Data
US 2016/0040390 A1 Feb. 11, 2016

(51) Int. Cl.
E02F 9/08 (2006.01)
F01N 3/20 (2006.01)
F01N 13/18 (2010.01)

(52) U.S. Cl.
CPC .............. *E02F 9/0883* (2013.01); *E02F 9/0866* (2013.01); *F01N 3/2066* (2013.01); *F01N 13/18* (2013.01); *E02F 9/0833* (2013.01); *E02F 9/0875* (2013.01); *E02F 9/0891* (2013.01)

(58) Field of Classification Search
CPC ..... E02F 9/0883; E02F 9/0866; E02F 9/0875; E02F 9/0833; B60Y 2200/412; F01N 2610/1406
See application file for complete search history.

(56) References Cited

U.S. PATENT DOCUMENTS

| 8,973,692 B1* | 3/2015 | Okuda | B60L 11/1877 180/68.5 |
|---|---|---|---|
| 2005/0201852 A1* | 9/2005 | Iida | E02F 9/0883 414/385 |
| 2010/0266458 A1* | 10/2010 | Takeshita | E02F 9/0866 422/109 |
| 2011/0005853 A1* | 1/2011 | Kamiya | B60K 13/04 180/296 |
| 2012/0174566 A1* | 7/2012 | Yamashita | B60K 13/04 60/295 |
| 2013/0071295 A1 | 3/2013 | Terakawa et al. | |
| 2014/0023473 A1* | 1/2014 | Kobayashi | E02F 9/0875 414/687 |
| 2014/0196975 A1 | 7/2014 | Hata et al. | |

(Continued)

FOREIGN PATENT DOCUMENTS

CN 103562509 A 2/2014
CN 103608524 A 2/2014
(Continued)

OTHER PUBLICATIONS

U.S. Appl. No. 14/398,518, filed Nov. 3, 2014, Ozaki.

*Primary Examiner* — John Walters
*Assistant Examiner* — Brian Swenson
(74) *Attorney, Agent, or Firm* — Drinker Biddle & Reath LLP (57) ABSTRACT A hydraulic excavator capable of suppressing deterioration of a reducing agent stored in a reducing agent tank is provided. The hydraulic excavator includes: a main valve supplying a hydraulic oil to a work implement; an exhaust gas treatment device treating an exhaust gas from an engine through a reduction reaction; the reducing agent tank arranged forward of the main valve and storing the reducing agent to be supplied to the exhaust gas treatment device; and a partition plate arranged between the reducing agent tank and the main valve.

7 Claims, 9 Drawing Sheets

(56) References Cited

U.S. PATENT DOCUMENTS

| | | | | |
|---|---|---|---|---|
| 2014/0318882 | A1* | 10/2014 | Sawada | B60K 13/04 |
| | | | | 180/309 |
| 2015/0016932 | A1* | 1/2015 | Azuma | E02F 9/0833 |
| | | | | 414/687 |
| 2015/0086314 | A1 | 3/2015 | Okuda et al. | |
| 2015/0184361 | A1 | 7/2015 | Imano et al. | |

FOREIGN PATENT DOCUMENTS

| | | |
|---|---|---|
| CN | 103797195 A | 5/2014 |
| CN | 103890276 A | 6/2014 |
| JP | 2003-138599 A | 5/2003 |
| JP | 2008-240676 A | 10/2008 |
| JP | 2010-285814 A | 12/2010 |
| JP | 2011-012661 A | 1/2011 |
| JP | 2011-063988 A | 3/2011 |
| JP | 2013-002082 A | 1/2013 |
| JP | 2013-241808 A | 12/2013 |
| JP | 5402451 B2 | 1/2014 |
| JP | 2014-047551 A | 3/2014 |
| KR | 10-2014-0036180 A | 3/2014 |
| JP | 2014-080907 A | 5/2014 |
| JP | 5501536 B1 | 5/2014 |
| WO | WO-2011/033732 A1 | 3/2011 |
| WO | WO-2011/152223 A1 | 12/2011 |

* cited by examiner

HYDRAULIC EXCAVATOR

TECHNICAL FIELD

The present invention relates to a hydraulic excavator.

BACKGROUND ART

An exhaust gas treatment device is mounted on a hydraulic excavator. As the exhaust gas treatment device, for example, a diesel particulate filter device (DPF), a diesel oxidation catalyst device (DOC), a selective catalytic reduction device (SCR), and the like are available. In particular, the selective catalytic reduction device reduces a nitrogen oxide in an exhaust gas to thereby purify the exhaust gas. A reducing agent used for this exhaust gas treatment is stored in a reducing agent tank.

Japanese Patent Laying-Open No. 2013-2082 (PTD 1) discloses a structure in which a bracket is provided in an equipment accommodating case which is located on the front side of a hydraulic oil tank and a fuel tank, a control valve is mounted on a support plate of the bracket, and a reducing agent tank is arranged between the support plate and a revolving frame.

CITATION LIST

Patent Document

PTD 1: Japanese Patent Laying-Open No. 2013-2082

SUMMARY OF INVENTION

Technical Problem

The revolving frame of the hydraulic excavator has a limited area, and many devices which are to reach a high temperature need to be arranged on the revolving frame. In the case where the reducing agent tank is mounted on the revolving frame, there is a possibility that the reducing agent tank receives heat from the high-temperature devices to thereby raise the temperature of the reducing agent and accordingly deteriorates the reducing agent.

An object of the present invention is to provide a hydraulic excavator capable of suppressing deterioration of a reducing agent stored in a reducing agent tank.

Solution to Problem

A hydraulic excavator of the present invention includes a work implement, an engine, a main valve, an exhaust gas treatment device, a reducing agent tank, and a partition plate. The main valve supplies a hydraulic oil to the work implement. The exhaust gas treatment device treats an exhaust gas from the engine through a reduction reaction. The reducing agent tank is arranged forward of the main valve. The reducing agent tank stores a reducing agent to be supplied to the exhaust gas treatment device. The partition plate is arranged between the reducing agent tank and the main valve.

A reducing agent and a precursor of the reducing agent are herein collectively referred to as "reducing agent."

In the hydraulic excavator of the present invention, the partition plate arranged between the reducing agent tank and the main valve suppresses heat transfer from the main valve to the reducing agent tank, and therefore, deterioration, due to an increase in temperature, of the reducing agent stored in the reducing agent tank can be suppressed.

Regarding the hydraulic excavator, the partition plate serves as a partition between a tank room housing the reducing agent tank and a valve room housing the main valve. Accordingly, heat transfer from the main valve to the reducing agent tank can more reliably be suppressed.

Regarding the hydraulic excavator, of a wall portion defining the tank room, only the partition plate is interposed between the main valve and the reducing agent tank. In this way, heat transfer to the reducing agent tank can effectively be suppressed, and moreover, heat dissipation from the reducing agent tank can be promoted.

Regarding the hydraulic excavator, the reducing agent tank is arranged at a corner of the tank room as seen in a plan view, in a front portion in the tank room. The reducing agent tank is thus arranged at the position closer to the wall portion which defines the tank room, and accordingly heat dissipation from the reducing agent tank to the outside air can further be promoted.

Regarding the hydraulic excavator, at least one of a front side and a lateral side of a wall portion defining the tank room has a communication hole formed for allowing an inside and an outside of the tank room to communicate with each other. In this way, the outside air is allowed to flow into the tank room through the communication hole and the air in the tank room is allowed to flow to the outside therethrough. Thus, heat dissipation from the reducing agent tank to the outside air can still further be promoted.

The hydraulic excavator further includes an openable and closable exterior cover forming a part of a lateral side of a body of the excavator. The exterior cover in a closed state forms a lateral wall portion of the tank room. The reducing agent tank and the main valve are made accessible by opening of the exterior cover. In this way, maintenance of the reducing agent tank and the main valve can easily be performed.

Regarding the hydraulic excavator, a ceiling surface of the tank room is lower than a ceiling surface of the valve room. The hydraulic excavator further includes a coupling plate coupling a rear edge of the ceiling surface of the tank room and a front edge of the ceiling surface of the valve room to each other and extending in a vertical direction. The partition plate extends toward the coupling plate. In this way, the cost for the partition plate can be reduced since the partition plate having a smaller area can be used.

The hydraulic excavator further includes a pump module including a pump transferring the reducing agent, and a support column supporting the pump module. The partition plate is secured to the support column. In this way, the partition plate can be secured and supported by means of the simple structure.

Advantageous Effects of Invention

As seen from the foregoing, the present invention can suppress heat transfer to the reducing agent tank and thereby suppress deterioration, due to a temperature increase, of the reducing agent stored in the reducing agent tank.

DESCRIPTION OF EMBODIMENTS

An embodiment of the present invention will be described hereinafter with reference to the drawings.

Initially, a structure of a hydraulic excavator to which the concept according to the present invention is applicable will be described.

Figure 1:
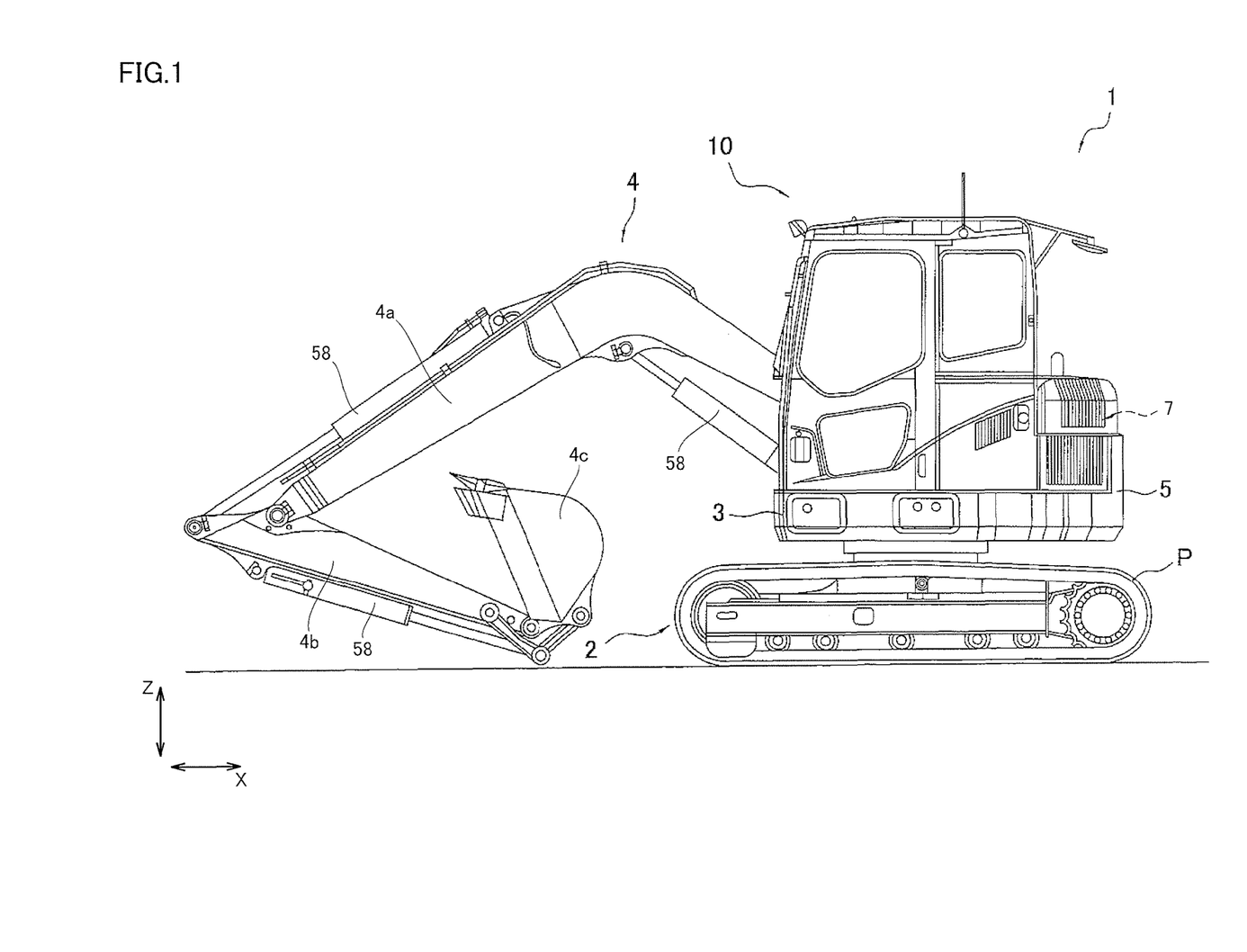
FIG. 1 is a side view showing a structure of a hydraulic excavator according to one embodiment of the present invention.

FIG. 1 is a side view showing a structure of a hydraulic excavator according to one embodiment of the present invention. Hydraulic excavator 1 according to the present embodiment mainly includes a lower carrier 2, an upper revolving unit 3, a work implement 4, a counterweight 5, an engine 7, and a cab 10, as shown in FIG. 1. A main body of the hydraulic excavator is mainly constituted of lower carrier 2 and upper revolving unit 3.

Lower carrier 2 has a pair of crawler belts P wound around left and right opposing end portions in a direction of travel. Lower carrier 2 is structured to be self-propelled as the pair of crawler belts P rotates.

Upper revolving unit 3 is set to be revolvable in any direction with respect to lower carrier 2. Upper revolving unit 3 includes, on a front left side, cab 10 which is an operator's cab that an operator of hydraulic excavator 1 gets on and off. Upper revolving unit 3 includes, on a rear side, counterweight 5 and an engine compartment for accommodating engine 7.

In the present embodiment, the forward side (front side) of a driver seated in cab 10 is defined as the forward side of upper revolving unit 3, the rear side of the driver seated therein is defined as the rear side of upper revolving unit 3, the left side of the driver in the seated state is defined as the left side of upper revolving unit 3, and the right side of the driver in the seated state is defined as the right side of upper revolving unit 3. In the description below, fore, aft, left, and right of upper revolving unit 3 correspond to fore, aft, left, and right of hydraulic excavator 1, respectively. In the drawings below, the fore/aft direction is shown with an arrow X in the drawings, the lateral direction is shown with an arrow Y in the drawings, and the vertical direction is shown with an arrow Z in the drawings.

Work implement 4 for such work as excavation of soil is pivotally supported by upper revolving unit 3 so as to be freely operable in the vertical direction. Work implement 4 has a boom 4a attached to be operable in the vertical direction in a substantially central portion on the forward side of upper revolving unit 3, an arm 4b attached to be operable in the fore/aft direction at the leading end of boom 4a, and a bucket 4c attached to be operable in the fore/aft direction at the leading end of arm 4b. Boom 4a, arm 4b, and bucket 4c are each configured to be driven by a hydraulic cylinder 58.

Work implement 4 is provided on the right side of cab 10, which is one lateral side of cab 10, such that an operator who is aboard cab 10 can view the leading end of work implement 4. Cab 10 is arranged laterally with respect to a portion where work implement 4 is attached.

Counterweight 5 is a weight arranged in the rear portion of upper revolving unit 3 for keeping balance of the excavator's body during excavation or the like. Hydraulic excavator 1 is formed as a short tail swing hydraulic excavator, which is small in radius of swing of a rear surface of counterweight 5. Therefore, the rear surface of counterweight 5 is formed in an arc shape around a center of swing of upper revolving unit 3 when viewed from above. Engine 7 is accommodated in the engine compartment in the rear portion of upper revolving unit 3.

Figure 2:
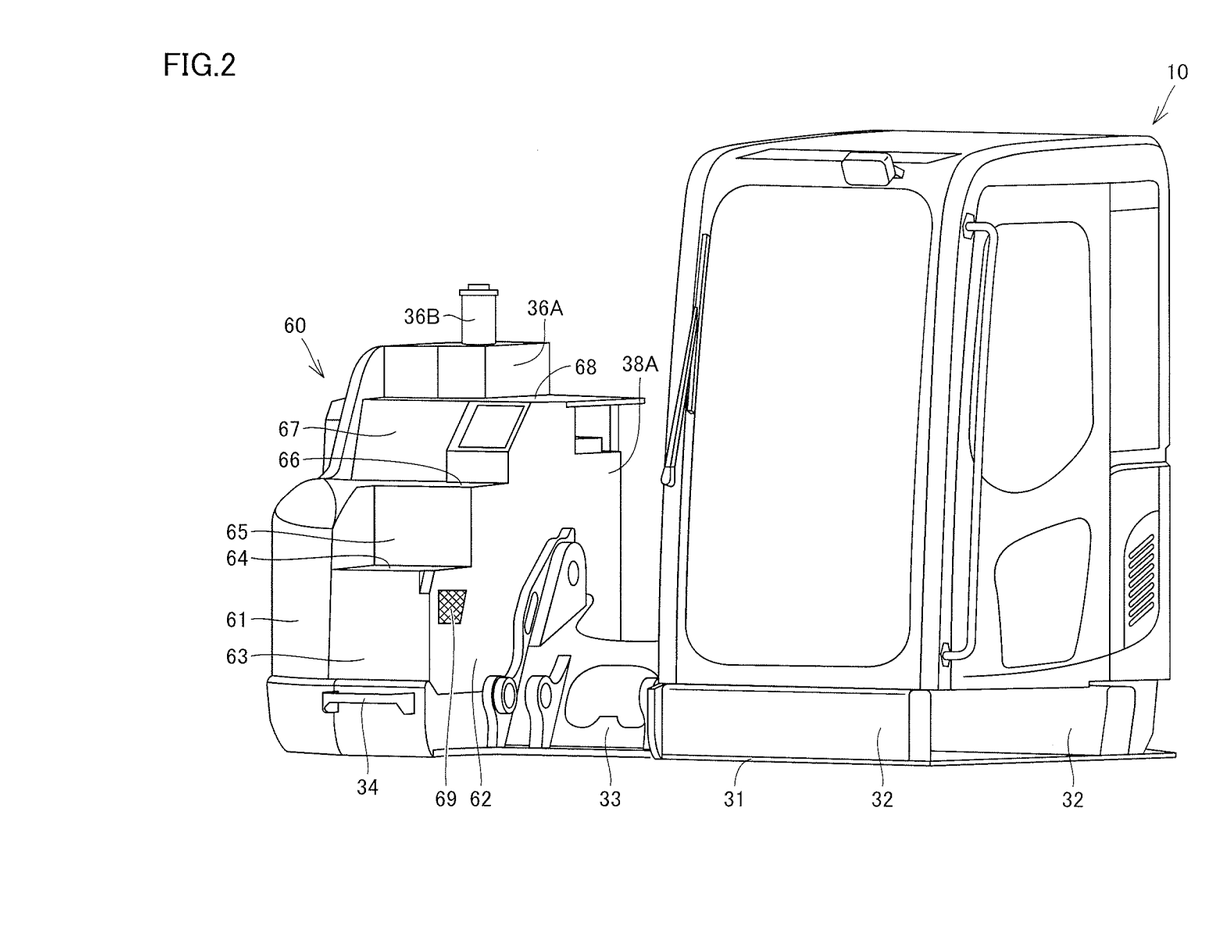
FIG. 2 is a perspective view showing a partial structure of an upper revolving unit of the hydraulic excavator in FIG. 1.

FIG. 2 is a perspective view showing a partial structure of upper revolving unit 3 of hydraulic excavator in FIG. 1. In FIG. 2, a part of the structure of upper revolving unit 3 of hydraulic excavator 1 shown in FIG. 1, as seen from the front left side, is illustrated. As shown in FIG. 2, upper revolving unit 3 has a revolving frame 31. Revolving frame 31 is included in the main body of the hydraulic excavator. Revolving frame 31 is arranged above lower carrier 2 shown in FIG. 1, and provided to freely revolve in any direction with respect to lower carrier 2.

On the upper surface of revolving frame 31, a pair of floor frames 32, 32 is arranged in the fore/aft direction with a space therebetween. Cab 10 is placed on floor frames 32, 32. Cab 10 is mounted on revolving frame 31 with floor frames 32 interposed therebetween.

At the front end of a central portion in the lateral direction of revolving frame 31, a center bracket 33 is provided. The proximal end of work implement 4 shown in FIG. 1 is attached to center bracket 33. Center bracket 33 supports work implement 4 of hydraulic excavator 1, and forms the portion where work implement 4 is attached.

Figure 3:
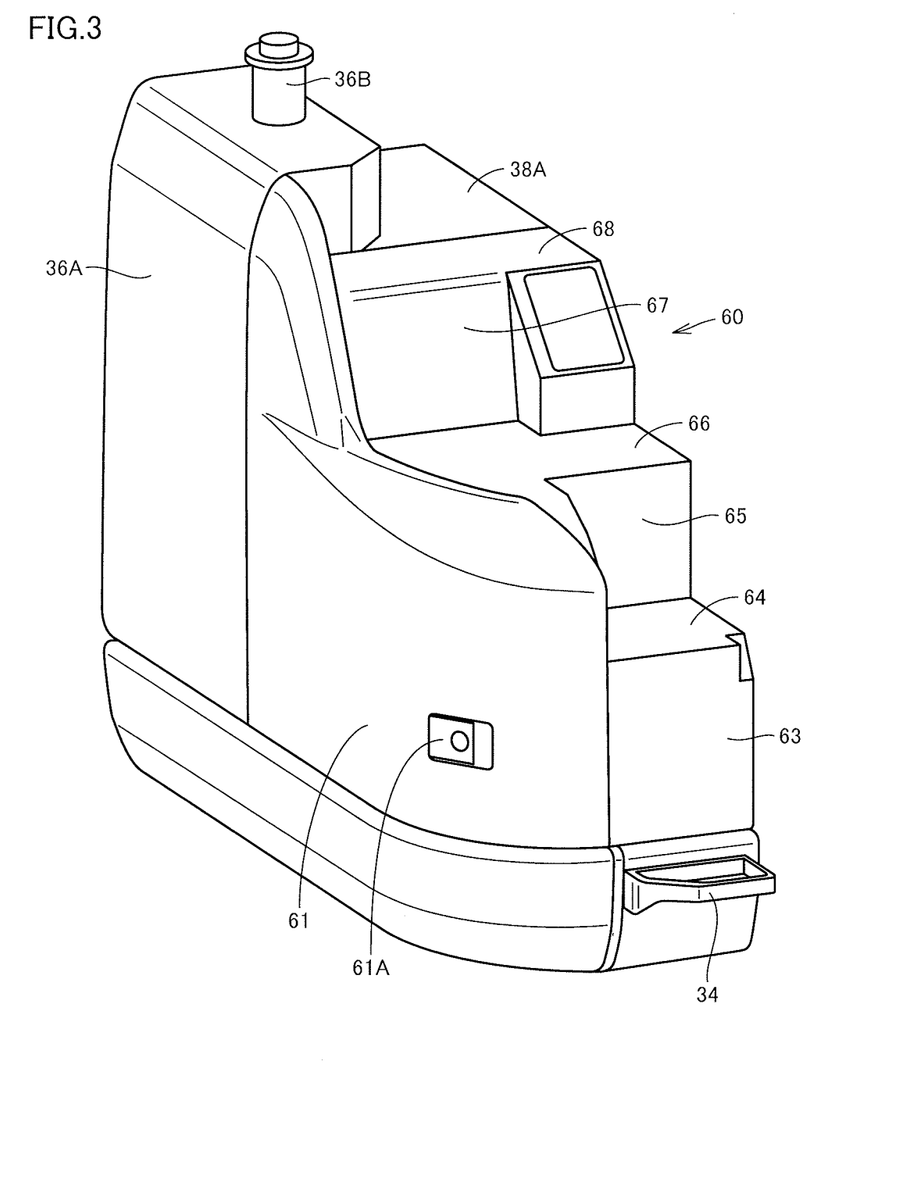
FIG. 3 is a perspective view showing a structure of a front cover and tank covers.

At a right forward side of revolving frame 31, a front cover 60 is arranged. Tank covers 36A, 38A are arranged rearward with respect to front cover 60. FIG. 3 is a perspective view showing a structure of front cover 60 and tank covers 36A, 38A. In front cover 60, a tank room 92 and a valve room 97 which will be described later herein are formed. In tank cover 36A, a fuel tank 36 which will be described later herein is housed. In the upper surface of tank cover 36A, a filler port 36B is provided for replenishing fuel tank 36 with a fuel. In tank cover 38A, a hydraulic oil tank 38 which will be described later herein is housed.

Front cover 60 has an exterior cover 61 and a left side plate 62. Exterior cover 61 forms the right side of front cover 60 and forms a part of a lateral side of the main body of the hydraulic excavator. Exterior cover 61 extends from the front end of tank cover 36A toward the front end of upper revolving unit 3. Exterior cover 61 is provided so that it is openable and closable. Exterior cover 61 has a handle 61A. A serviceperson can hold handle 61A of exterior cover 61 in a closed state to pivot exterior cover 61 and thereby open exterior cover 61.

Left side plate 62 shown in FIG. 2 forms the left side of front cover 60. Left side plate 62 is opposite to exterior cover 61 with some components such as a reducing agent tank 20 and a main valve 57, which will be described later herein, interposed therebetween. Left side plate 62 is opposite to the right side of cab 10 with center bracket 33 interposed therebetween. Left side plate 62 extends in the fore/aft direction of upper revolving unit 3. In left side plate 62, a vent hole 69 is formed. Vent hole 69 allows tank room 92, which is formed inside front cover 60, and an external space of front cover 60 to communicate with each other.

Front cover 60 also has a front end plate 63, a lower step plate 64, a vertical plate 65, an upper step plate 66, a vertical plate 67, and a ceiling plate 68. Front cover 60 is provided between tank covers 36A, 38A and the front end of upper revolving unit 3.

Front end plate 63 is provided to extend in the vertical direction at the front end of upper revolving unit 3. Lower step plate 64 extends rearward from the upper edge of front end plate 63. Vertical plate 65 extends upward from the rear edge of lower step plate 64. Upper step plate 66 extends rearward from the upper edge of vertical plate 65. Vertical plate 67 extends upward from the rear edge of upper step plate 66. Ceiling plate 68 extends rearward from the upper edge of vertical plate 67. Ceiling plate 68 is arranged so that it is substantially coplanar with the upper surface of tank cover 38A.

A step 34 is provided to protrude forward from front end plate 63. Front end plate 63, lower step plate 64, vertical plate 65, upper step plate 66, vertical plate 67, and ceiling plate 68 constitute a shape of stairs. Placement of feet on step 34 and then on lower step plate 64 and upper step plate 66 of front cover 60 in this order enables easy access onto ceiling plate 68. Accordingly, a serviceperson can easily and safely perform work such as replenishment of fuel tank 36 with a fuel, oil supply to hydraulic oil tank 38, and maintenance of engine 7.

Figure 4:
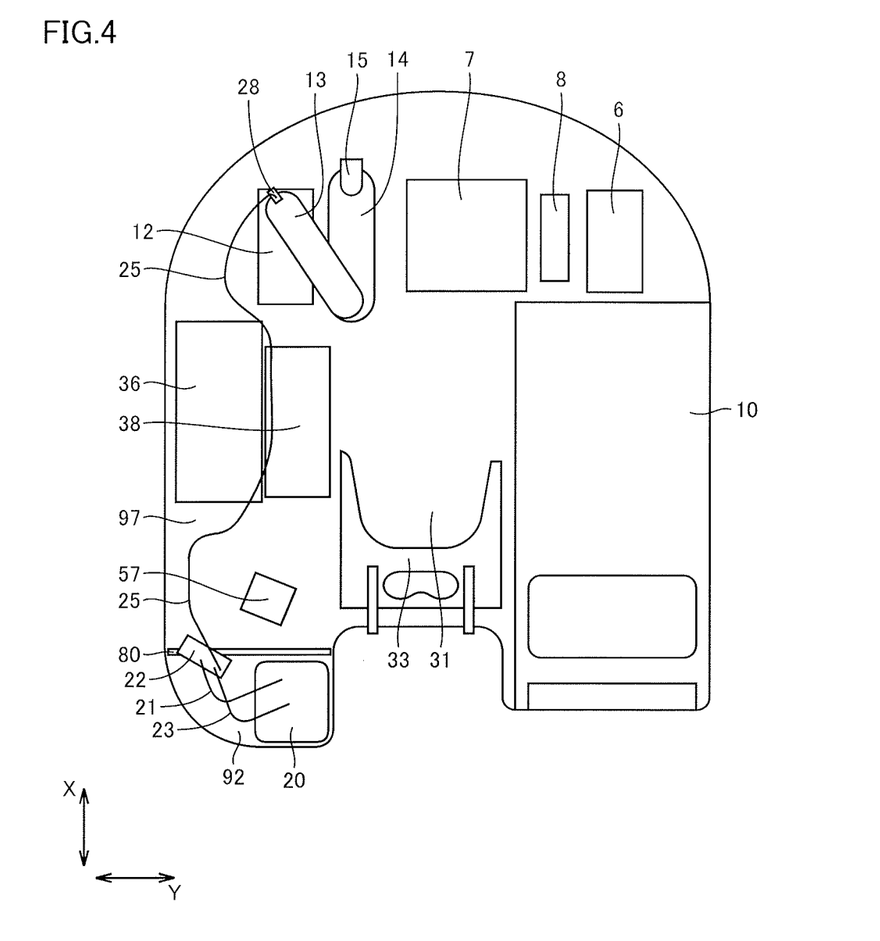
FIG. 4 is a schematic plan view showing arrangement of each device on a revolving frame.

Next, a description will be given, with reference to FIG. 4, of a path of reducing agent piping from the reducing agent tank to an exhaust gas treatment unit in hydraulic excavator 1 of the present embodiment. FIG. 4 is a schematic plan view showing arrangement of each device on revolving frame 31. The lower side in FIG. 4 is the forward side of upper revolving unit 3 and the upper side in FIG. 4 is the rear side of upper revolving unit 3. FIG. 4 illustrates a path of piping (a supply pipe 21 and a delivery pipe 25) for supplying a reducing agent from reducing agent tank 20 to the exhaust gas treatment unit over revolving frame 31 in hydraulic excavator 1 shown in FIG. 1.

Engine 7 which is a motive power source for driving lower carrier 2 and work implement 4 shown in FIG. 1 is mounted on revolving frame 31. Engine 7 is mounted on a rear portion of a center frame located at the center in the lateral direction of revolving frame 31. Engine 7 which is large in weight is arranged at the rear end of the main body of the hydraulic excavator, which is distant from center bracket 33 supporting work implement 4 and is close to counterweight 5, in consideration of weight balance with work implement 4 attached to the front of the main body of the hydraulic excavator. The engine compartment accommodating engine 7 is provided in the rear portion of upper revolving unit 3.

The engine compartment accommodates a cooling unit 6 and a fan 8. In the engine compartment, cooling unit 6, fan 8, and engine 7 are disposed in this order from left to right. Fan 8 is rotationally driven by engine 7 so as to generate a flow of air which passes through the engine compartment. Fan 8 generates a flow of air from the left to the right of the main body of the hydraulic excavator. Cooling unit 6 is arranged on the left of fan 8, which is upstream in the flow of air generated by fan 8. Engine 7 is arranged on the right of fan 8, which is downstream in the flow of air generated by fan 8.

Cooling unit 6 is structured to include a radiator 16 (FIG. 5) which will be described later herein, an intercooler, and an oil cooler 59 (FIG. 6) which will be described later herein. Radiator 16 is a cooling device for cooling a coolant for engine 7. The intercooler is a cooling device for cooling compression air supplied to engine 7. Oil cooler 59 is a cooling device for cooling a hydraulic oil supplied to various hydraulic actuators mounted on hydraulic excavator 1, such as hydraulic cylinder 58 (FIG. 1).

Hydraulic excavator 1 also includes in the engine compartment, an exhaust gas treatment unit for treating and purifying an exhaust gas emitted from engine 7. The exhaust gas treatment unit mainly includes exhaust gas treatment devices 12 and 14, an intermediate connection pipe 13, an exhaust stack 15, and an injection nozzle 28 for a reducing agent. In the plan view shown in FIG. 4, the exhaust gas treatment unit is arranged on the right of engine 7. A hydraulic pump 56 (see FIG. 6, not shown in FIG. 4) driven by engine 7 to transfer a hydraulic oil is directly coupled to engine 7. Hydraulic pump 56 is arranged adjacently on the right of engine 7 and the exhaust gas treatment unit is arranged above hydraulic pump 56.

Exhaust gas treatment device 12 is connected to engine 7 through an exhaust pipe 11 (FIG. 5) which will be described later herein. Exhaust gas treatment device 14 is connected to exhaust gas treatment device 12 through intermediate connection pipe 13. The exhaust gas emitted from engine 7 is passed successively through exhaust gas treatment devices 12 and 14 and emitted from exhaust stack 15 into atmosphere. In the flow of emission of the exhaust gas from engine 7, exhaust gas treatment device 12 is arranged downstream of engine 7 and exhaust gas treatment device 14 is arranged downstream of exhaust gas treatment device 12.

Exhaust gas treatment device 12 oxidizes an unburned gas such as carbon monoxide and hydrocarbon contained in the exhaust gas emitted from engine 7 so as to lower a concentration of the unburned gas in the exhaust gas. Exhaust gas treatment device 12 is a diesel oxidation catalyst device, for example. Exhaust gas treatment device 14 reduces a nitrogen oxide contained in the exhaust gas through reaction with a reducing agent and chemically changes the nitrogen oxide to a harmless nitrogen gas, to thereby lower a concentration of the nitrogen oxide in the exhaust gas. Exhaust gas treatment device 14 is an NO removal device of a selective catalytic reduction type, for example. Intermediate connection pipe 13 is provided with injection nozzle 28 for injecting a reducing agent into intermediate connection pipe 13. Intermediate connection pipe 13 has a function as a mixing pipe for injecting and mixing the reducing agent into the exhaust gas.

Hydraulic excavator 1 also includes a reducing agent supply portion for supplying a reducing agent to the exhaust gas treatment unit. The reducing agent supply portion includes reducing agent tank. 20 and a reducing agent pump 22. Reducing agent tank 20 stores a reducing agent used in exhaust gas treatment device 14. For example, a urea solution is suitably employed as the reducing agent. The reducing agent, however, is not limited thereto.

Reducing agent tank 20 and reducing agent pump 22 are mounted on a right side frame of revolving frame 31. Reducing agent pump 22 is arranged forward relative to the engine compartment. Reducing agent tank 20 is arranged forward relative to reducing agent pump 22. Reducing agent tank 20 is arranged at a distance from engine 7 which is a device at a high temperature, for prevention of deterioration of the reducing agent due to a temperature increase thereof, and it is arranged, for example, at the front end of revolving frame 31.

Reducing agent tank 20 and reducing agent pump 22 are coupled to each other through supply pipe 21 and a return pipe 23. Supply pipe 21 is a pipe for sending the reducing agent from reducing agent tank 20 to reducing agent pump 22. Return pipe 23 is a pipe for returning the reducing agent from reducing agent pump 22 to reducing agent tank 20. Reducing agent pump 22 and injection nozzle 28 are coupled to each other through delivery pipe 25. Delivery pipe 25 is a pipe for transferring the reducing agent from reducing agent pump 22 to injection nozzle 28.

The reducing agent transferred from reducing agent tank 20 through supply pipe 21 to reducing agent pump 22 is branched into two in reducing agent pump 22. The reducing agent not used for exhaust gas treatment is returned from reducing agent pump 22 through return pipe 23 to reducing agent tank 20. The reducing agent used for exhaust gas treatment reaches injection nozzle 28 from reducing agent pump 22 through delivery pipe 25 and is sprayed from injection nozzle 28 into intermediate connection pipe 13.

The exhaust gas from engine 7 flows into exhaust gas treatment device 14 through intermediate connection pipe 13. Intermediate connection pipe 13 is provided upstream of exhaust gas treatment device 14 in the flow of the exhaust gas. The reducing agent suctioned from reducing agent tank 20 is injected into the exhaust gas which flows through intermediate connection pipe 13, through injection nozzle 28 attached to intermediate connection pipe 13. The reducing agent is injected into the upstream side of exhaust gas treatment device 14 in the flow of the exhaust gas. An amount of the reducing agent injected into the exhaust gas is controlled based on a temperature of the exhaust gas which passes through exhaust gas treatment device 14 and a concentration of a nitrogen oxide in the exhaust gas.

Reducing agent tank 20 is arranged at the front end on revolving frame 31 and exhaust gas treatment device 14 is arranged at the rear end on revolving frame 31. With this arrangement, supply pipe 21 and delivery pipe 25 for transferring the reducing agent extend in the fore/aft direction of the main body of the hydraulic excavator and extend from the front end toward the rear end of revolving frame 31.

On the right side frame of revolving frame 31, fuel tank 36, hydraulic oil tank 38, and main valve 57 are also mounted. Fuel tank 36 stores a fuel to be supplied to engine 7. Hydraulic oil tank 38 stores a hydraulic oil to be supplied to such a hydraulic actuator as hydraulic cylinder 58 (FIG. 1).

Since fuel tank 36 and hydraulic oil tank 38 are large in weight, they are arranged at positions located forward of the exhaust gas treatment unit, in consideration of weight balance on revolving frame 31. Taking into account operability in an operation for replenishing fuel tank 36 with a fuel, fuel tank 36 is arranged closer to a lateral side end of revolving frame 31 than hydraulic oil tank 38. Fuel tank 36 and hydraulic oil tank 38 are each formed as a pressure-resistant tank in a rectangular parallelepiped shape. The front surface of each of fuel tank 36 and hydraulic oil tank 38 is formed as a rear wall of valve room 97 accommodating main valve 57.

Main valve 57 is formed as an assembly of a large number of control valves, pilot valves, and the like. Main valve 57 supplies and discharges a hydraulic oil suctioned from hydraulic oil tank 38 and transferred by hydraulic pump 56 (FIG. 6) to and from such a hydraulic actuator as hydraulic cylinder 58 shown in FIG. 1, as well as a motor for travel and a motor for swing which are not shown. Thus, main valve 57 actuates the body of hydraulic excavator 1 and work implement 4 in response to an operation by an operator.

Since main valve 57 is smaller in weight than fuel tank 36 and hydraulic oil tank 38, it is arranged forward with respect to fuel tank 36 and hydraulic oil tank 38, in consideration of weight balance on revolving frame 31. Main valve 57 is arranged rearward with respect to reducing agent tank 20.

Valve room 97 accommodating main valve 57 and tank room 92 accommodating reducing agent tank 20 are partitioned off from each other by a partition plate 80. Partition plate 80 is arranged rearward with respect to reducing agent tank 20 and forward with respect to main valve 57, and arranged between reducing agent tank 20 and main valve 57.

Partition plate 80 is interposed between reducing agent tank 20 and main valve 57 in the fore/aft direction of upper revolving unit 3.

Partition plate 80 is formed as a front wall of valve room 97. Partition plate 80 is formed as a rear wall of tank room 92. A front wall of tank room 92 is formed by front end plate 63 shown in FIGS. 2 and 3. A right sidewall of tank room 92 is formed by exterior cover 61 in the closed state shown in FIG. 3. A left sidewall of tank room 92 is formed by left side plate 62 shown in FIG. 2.

Exterior cover 61, left side plate 62, front end plate 63, and partition plate 80 constitute a wall portion defining tank room 92. Of the wall portion defining tank room 92, only partition plate 80 which is the rear wall portion is interposed between main valve 57 and reducing agent tank 20. Of the wall portion defining tank room 92, left side plate 62 which is a left wall portion has vent hole 69 (FIG. 2) formed therein. Vent hole 69 is formed to serve as a communication hole allowing the inside and the outside of tank room 92 to communicate with each other.

Reducing agent tank 20 is arranged at a corner of tank room 92 as seen in a plan view, in a front portion in tank room 92. Reducing agent tank 20 is formed substantially in a rectangular parallelepiped shape. The front surface of reducing agent tank 20 is opposite to front end plate 63 with a slight gap between the front surface and front end plate 63. The left surface of reducing agent tank 20 is opposite to left side plate 62 with a slight gap between the left surface and left side plate 62. Reducing agent tank 20 is arranged relatively closer to the front wall of tank room 92 than to the rear wall thereof.

At the corner formed by front end plate 63 and left side plate 62, reducing agent tank 20 is arranged. As shown in FIGS. 2 and 3, a front end portion of exterior cover 61 is curved. Therefore, reducing agent tank 20 which is rectangular as seen in a plan view is arranged adjacently to left side plate 62 to thereby enable reducing agent tank 20 to be located closer to the wall portion which defines tank room 92.

Figure 5:
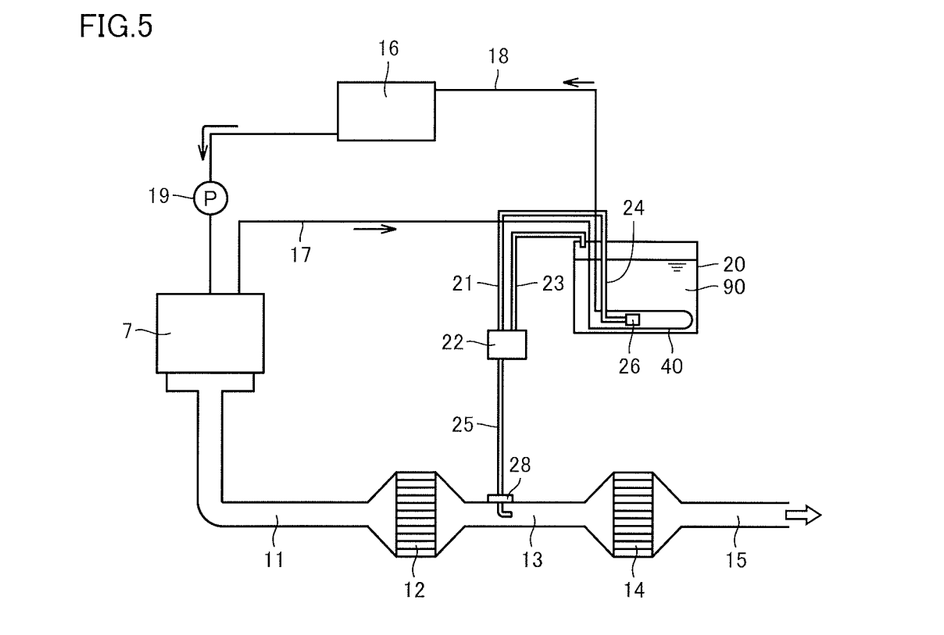
FIG. 5 is a functional diagram schematically showing a path for a reducing agent, a path for a medium for use in heat exchange, and an exhaust path for an exhaust gas from an engine.

FIG. 5 is a functional diagram schematically showing a path for the reducing agent, a path for a medium for use in heat exchange, and an exhaust path for the exhaust gas from engine 7 in hydraulic excavator 1 of the present embodiment. As shown in FIG. 5, the exhaust gas emitted from engine 7 is passed successively through exhaust pipe 11, exhaust gas treatment device 12, intermediate connection pipe 13, and exhaust gas treatment device 14 and then exhausted from exhaust stack 15 to the outside of the hydraulic excavator. Injection nozzle 28 is provided in intermediate connection pipe 13 located upstream of exhaust gas treatment device 14 in the flow of the exhaust gas.

A reducing agent 90 is stored in reducing agent tank 20. A suction pipe 24 in which reducing agent 90 which flows out of reducing agent tank 20 flows is arranged in reducing agent tank 20. A strainer (filter) 26 is connected to the leading end of suction pipe 24. Suction pipe 24 is coupled to supply pipe 21. Reducing agent 90 suctioned from reducing agent tank 20 is transferred by reducing agent pump 22 and reaches injection nozzle 28 after successively passed through supply pipe 21 and delivery pipe 25. Reducing agent 90 not used for exhaust gas treatment is returned to reducing agent tank 20 from reducing agent pump 22 through return pipe 23.

Injection nozzle 28 has a function as a reducing agent injector for injecting reducing agent 90 suctioned from reducing agent tank 20 to the upstream side of the exhaust gas relative to exhaust gas treatment device 14. Injection nozzle 28 supplies reducing agent 90 into the exhaust gas which flows through intermediate connection pipe 13. The concentration of a nitrogen oxide in the exhaust gas lowers as a result of reaction of the nitrogen oxide contained in the exhaust gas with reducing agent 90 in exhaust gas treatment device 14. In a case that a urea solution is employed as reducing agent 90, the urea solution is decomposed in intermediate connection pipe 13 and converted to ammonia, so that the nitrogen oxide is decomposed to harmless nitrogen and oxygen as a result of reaction between the nitrogen oxide and ammonia. An exhaust gas in which the amount of nitrogen oxide has lowered to an appropriate value is emitted through exhaust stack 15.

In reducing agent tank 20, a heat exchanger 40 is arranged through which a medium for heat exchange with reducing agent 90 (heat exchange medium) flows. As the heat exchange medium, a coolant for engine 7 is used. Heat exchanger 40 has a first conduit directing the heat exchange medium into reducing agent tank 20, and a second conduit for flowing the heat exchange medium out of reducing agent tank 20. The first conduit is coupled to a coolant pipe 17. The second conduit is coupled to a coolant pipe 18. On coolant pipe 18, radiator 16 and a coolant pump 19 are provided.

Coolant pump 19 is driven to cause the coolant for engine 7 to circulate through engine 7, heat exchanger 40, radiator 16, and coolant pump 19. The coolant heated by engine 7 exchanges its heat with reducing agent 90 in heat exchanger 40 to be accordingly cooled. Meanwhile, reducing agent 90 receives heat from the coolant to be accordingly heated. Radiator 16 is a heat exchanger for exchanging heat between the coolant and air to cool the coolant. The coolant cooled in radiator 16 flows in a water jacket of engine 7 to appropriately cool engine 7.

Figure 6:
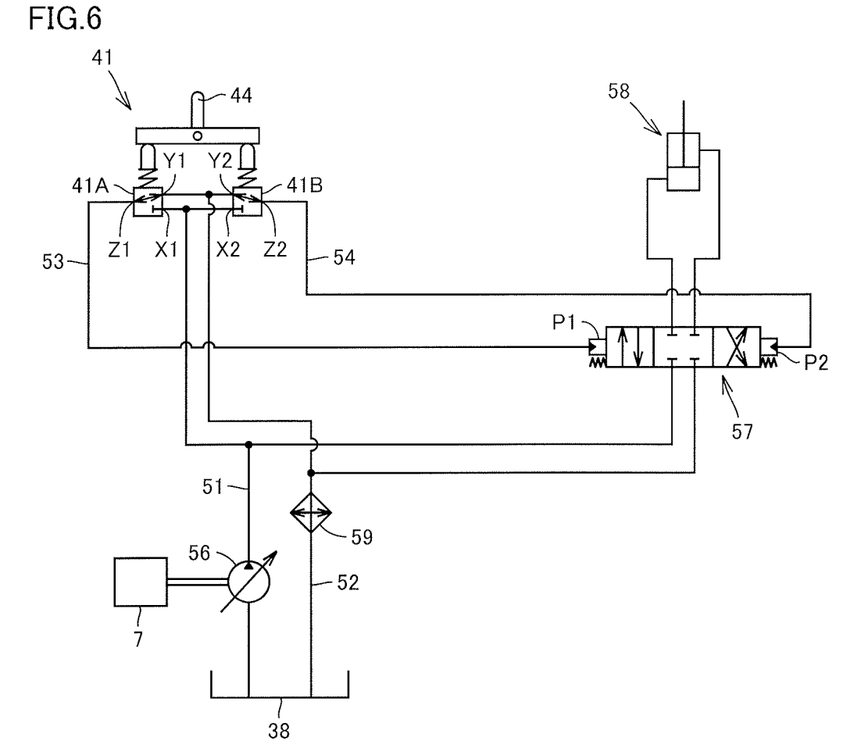
FIG. 6 is a hydraulic circuit diagram applied to a hydraulic excavator.

FIG. 6 is a hydraulic circuit diagram applied to hydraulic excavator 1 in FIG. 1. In a hydraulic system of the present embodiment shown in FIG. 6, hydraulic pump 56 is directly coupled to engine 7. Hydraulic pump 56 is driven by engine 7 to serve as a drive source for driving hydraulic actuators such as hydraulic cylinder 58 for driving work implement 4 shown in FIG. 1. The hydraulic oil delivered from hydraulic pump 56 is supplied to hydraulic cylinder 58 through main valve 57. The hydraulic oil supplied to hydraulic cylinder 58 is discharged to hydraulic oil tank 38 through main valve 57. Hydraulic oil tank 38 stores the hydraulic oil therein.

Main valve 57 controls supply and discharge of the hydraulic oil to hydraulic cylinder 58. Main valve 57 has a pair of pilot ports p1, p2. The hydraulic oil having a predetermined pilot pressure is supplied to each of pilot ports p1, p2 to thereby control main valve 57.

The pilot pressure applied to main valve 57 is controlled through an operation of an operation lever device 41. Operation lever device 41 has an operation lever 44 operated by an operator, and a first pilot pressure control valve 41A and a second pilot pressure control valve 41B. To operation lever 44, pilot pressure control valves 41A, 41B are connected for controlling driving of hydraulic cylinder 58.

First pilot pressure control valve 41A has a first pump port X1, a first tank port Y1, and a first supply/discharge port Z1. First pump port X1 is connected to a pump flow passage 51. First tank port Y1 is connected to a tank flow passage 52. Pump flow passage 51 and tank flow passage 52 are connected to hydraulic oil tank 38. Hydraulic pump 56 is provided on pump flow passage 51. First supply/discharge port Z1 is connected to a first pilot conduit 53.

First pilot pressure control valve 41A is switched between an output state and a discharge state in response to an operation of operation lever 44. First pilot pressure control valve 41A in the output state causes first pump port X1 and first supply/discharge port Z1 to communicate with each other and outputs the hydraulic oil having a pressure, which is determined by the amount of the operation of operation lever 44, from first supply/discharge port Z1 to first pilot conduit 53. First pilot pressure control valve 41A in the discharge state causes first tank port Y1 and first supply/discharge port Z1 to communicate with each other.

Second pilot pressure control valve 41B has a second pump port X2, a second tank port Y2, and a second supply/discharge port Z2. Second pump port X2 is connected to pump flow passage 51. Second tank port Y2 is connected to tank flow passage 52. Second supply/discharge port Z2 is connected to a second pilot conduit 54.

Second pilot pressure control valve 41B is switched between an output state and a discharge state in response to an operation of operation lever 44. Second pilot pressure control valve 41B in the output state causes second pump port X2 and second supply/discharge port Z2 to communicate with each other and outputs the hydraulic oil having a pressure, which is determined by the amount of the operation of operation lever 44, from second supply/discharge port Z2 to second pilot conduit 54. Second pilot pressure control valve 41B in the discharge state causes second tank port Y2 and second supply/discharge port Z2 to communicate with each other.

First pilot pressure control valve 41A and second pilot pressure control valve 41B constitute a pair and correspond to directions opposite to each other in which operation lever 44 is operated. For example, first pilot pressure control valve 41A corresponds to an operation of tilting operation lever 44 forward, and second pilot pressure control valve 41B corresponds to an operation of tilting operation lever 44 rearward. Operation lever 44 is operated to select one of first pilot pressure control valve 41A and second pilot pressure control valve 41B. When first pilot pressure control valve 41A is in the output state, second pilot pressure control valve 41B is in the discharge state. When first pilot pressure control valve 41A is in the discharge state, second pilot pressure control valve 41B is in the output state.

First pilot pressure control valve 41A controls supply and discharge of the hydraulic oil to first pilot port p1 of main valve 57. Second pilot pressure control valve 41B controls supply and discharge of the hydraulic oil to second pilot port p2 of main valve 57. In response to an operation of operation lever 44, supply and discharge of the hydraulic oil to hydraulic cylinder 58 are controlled and extension and retraction of hydraulic cylinder 58 are controlled. In this way, the motion of work implement 4 is controlled, following the operation of operation lever 44.

On tank flow passage 52 serving as a flow passage for the hydraulic oil flowing toward hydraulic oil tank 38, oil cooler 59 is provided. Oil cooler 59 is included in cooling unit 6 shown in FIG. 4. Oil cooler 59 cools the hydraulic oil discharged from first pilot pressure control valve 41A or second pilot pressure control valve 41B to return to hydraulic oil tank 38. Oil cooler 59 also cools the hydraulic oil discharged from main valve 57 to return to hydraulic oil tank 38. As shown in FIG. 6, oil cooler 59 has a function of cooling the hydraulic oil to be supplied to hydraulic cylinder 58.

Figure 7:
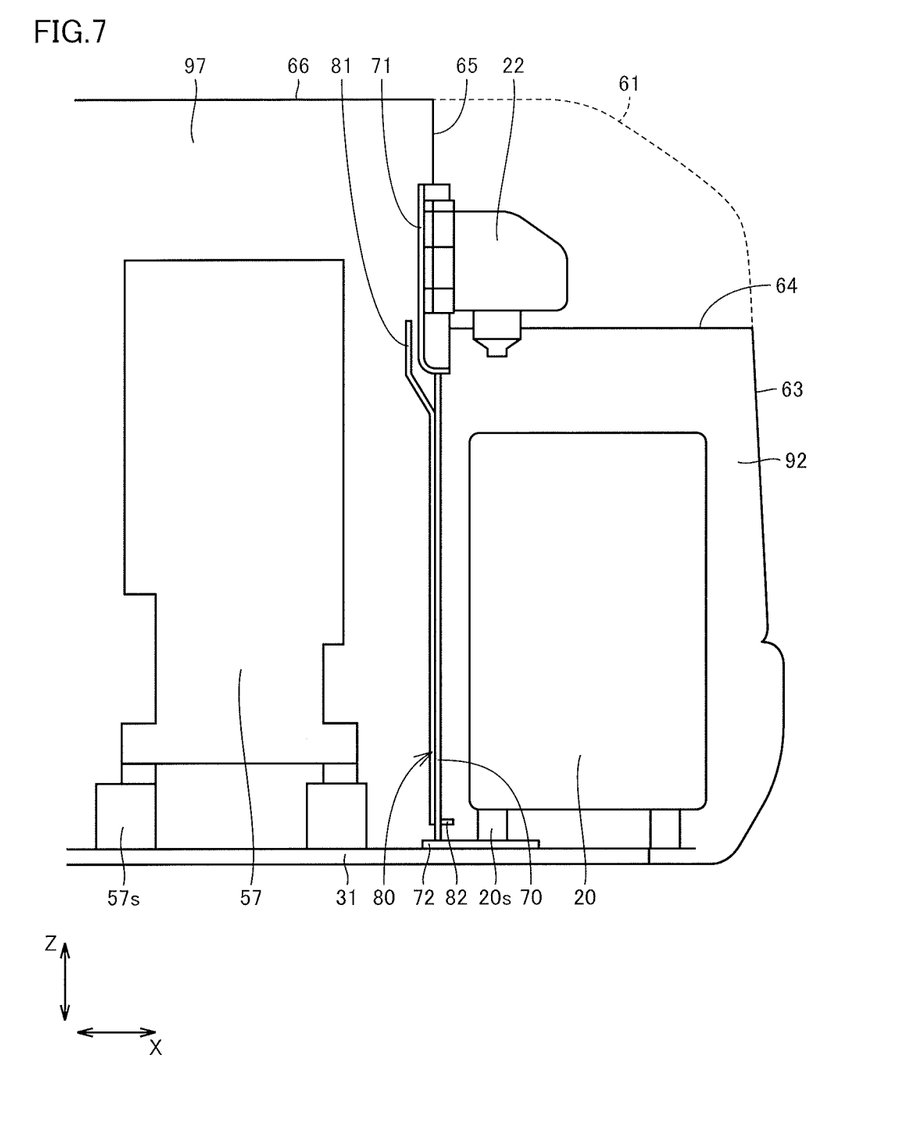
FIG. 7 is a schematic diagram showing a reducing agent tank and a main valve as seen laterally.

FIG. 7 is a schematic diagram showing reducing agent tank 20 and main valve 57 as seen laterally. As shown in FIG. 7, lower step plate 64 of front cover 60 (FIGS. 2 and 3) forms the ceiling surface of tank room 92 which houses reducing agent tank 20. Upper step plate 66 of front cover 60 forms the ceiling surface of valve room 97 which houses main valve 57.

Lower step plate 64 is arranged at a lower position than the position where upper step plate 66 is arranged. The ceiling surface of tank room 92 is lower than the ceiling surface of valve room 97. Vertical plate 65 of front cover 60 couples the front edge of upper step plate 66 and the rear edge of lower step plate 64 to each other and extends in the vertical direction. Vertical plate 65 forms a coupling plate which couples the ceiling surface of tank room 92 and the ceiling surface of valve room 97 to each other.

Reducing agent tank 20 is mounted on revolving frame 31 with a tank support 20s interposed therebetween. Main valve 57 is mounted on revolving frame 31 with a valve support 57s interposed therebetween. On revolving frame 31, a flat-sheet-like base plate member 72 is also provided. Base plate member 72 is arranged in parallel with revolving frame 31 and secured to revolving frame 31.

Between reducing agent tank 20 and main valve 57 in the fore/aft direction of the excavator's body, a support column 70 is arranged. Support column 70 extends along the vertical direction. The lower end of support column 70 is secured to base plate member 72. Support column 70 is mounted on revolving frame 31 with base plate member 72 interposed therebetween.

A pump module including reducing agent pump 22 is arranged above reducing agent tank 20 in the vertical direction of the excavator's body. The pump module is attached to an attachment portion 71. Attachment portion 71 is secured to the upper end of support column 70. The pump module is supported by support column 70. The pump module is mounted on revolving frame 31 with support column 70 interposed therebetween.

Partition plate 80 is arranged between reducing agent tank 20 and main valve 57 to serve as a partition between tank room 92 and valve room 97. Partition plate 80 has a heat insulation effect. Partition plate 80 has a function of suppressing heat transfer to reducing agent tank 20 from a heat source which is arranged rearward with respect to reducing agent tank 20. The heat source arranged rearward with respect to reducing agent tank 20 includes engine 7, hydraulic oil tank 38, main valve 57, and fuel tank 36, for example.

Partition plate 80 is arranged on the valve room 97 side with respect to support column 70, and extends in the vertical direction along support column 70. Partition plate 80 is arranged so that it is substantially coplanar with vertical plate 65 of front cover 60. Partition plate 80 extends in the vertical direction toward vertical plate 65. Partition plate 80 has a bent portion 81 which is its upper bent end and a bent portion 82 which is its lower bent end. Bent portion 81 is opposite to the rear edge of lower step plate 64 of front cover 60 with a gap therebetween, and arranged rearward with respect to lower step plate 64. Bent portion 82 is opposite to revolving frame 31 with a gap therebetween, and arranged above revolving frame 31.

In the gap between partition plate 80 and front cover 60 or revolving frame 31, a filler such as sponge (not shown) is arranged. The filler fills the gap between partition plate 80 and front cover 60 or revolving frame 31 to thereby suppress flow of air from valve room 97 into tank room 92.

Figure 8:
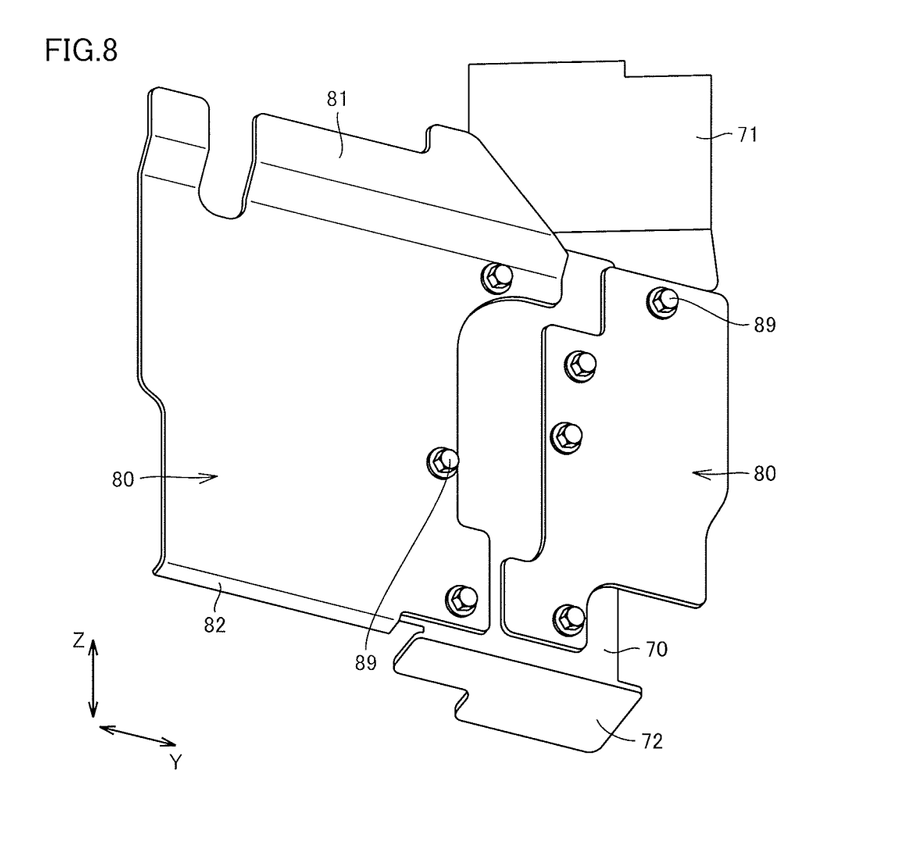
FIG. 8 is a schematic diagram showing a support structure of a partition plate.

Partition plate 80 is secured to support column 70 which supports the pump module. FIG. 8 is a schematic diagram showing a support structure of partition plate 80. In FIG. 8, a structure made up of support column 70 and partition plate 80 which are secured to each other, as seen from below from the valve room 97 side, is illustrated.

As shown in FIG. 8, partition plate 80 is secured to support column 70 with bolts 89 and supported by support column 70. At multiple spots of partition plate 80 formed of a thin plate, through holes extending through partition plate 80 in the thickness direction are formed. Bolts 89 are screwed into nuts which are secured around respective through holes to thereby attach partition plate 80 to support column 70.

Partition plate 80 is made up of two members, and the two members are separately secured to support column 70 with the bolts. Accordingly, the material necessary for forming partition plate 80 is reduced. Instead of this structure, partition plate 80 may be formed of one plate member. In this case, partition plate 80 is more easily attached to support column 70.

Figure 9:
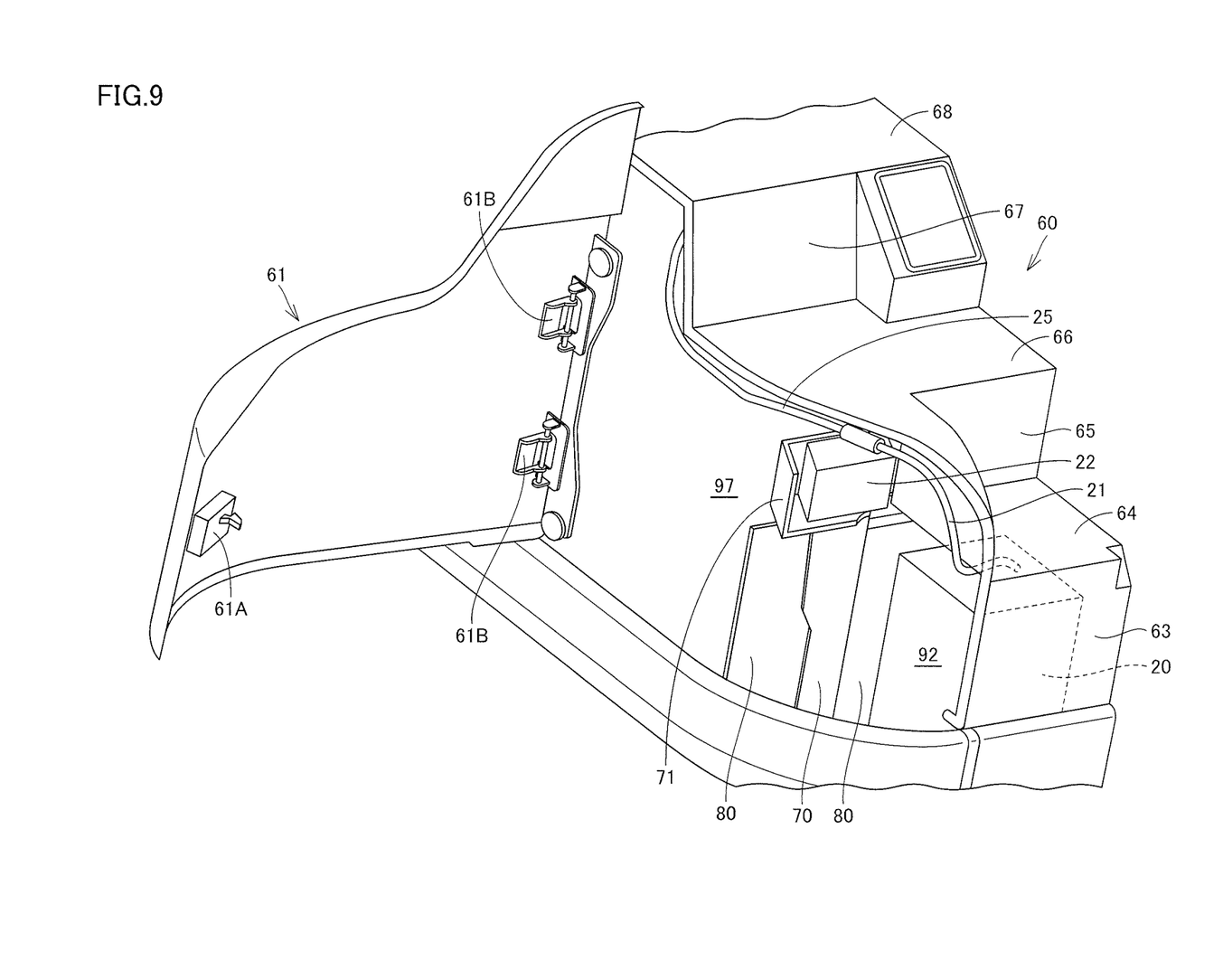
FIG. 9 is a perspective view showing a state where an exterior cover is opened.

FIG. 9 is a perspective view showing a state where exterior cover 61 is opened. As shown in FIG. 9, exterior cover 61 has a pair of hinge portions 61B. Exterior cover 61 is attached by hinge portions 61B to a portion near the front surface of fuel tank 36 (FIG. 4) so that the cover is openable and closable.

In the state where exterior cover 61 is opened as shown in FIG. 9, respective lateral side surfaces of tank room 92 and valve room 97 are opened and reducing agent tank 20 and main valve 57 which are not shown in FIG. 9 are exposed to the outside. A serviceperson can open exterior cover 61 to easily access reducing agent tank 20 and main valve 57. The serviceperson can thus open exterior cover 61 to easily conduct work such as replenishment of reducing agent tank 20 with the reducing agent and maintenance of main valve 57.

Next, functions and effects of the present embodiment will be described.

Hydraulic excavator 1 of the present embodiment includes, as shown in FIGS. 4 and 7, main valve 57 supplying a hydraulic oil to work implement 4, exhaust gas treatment device 14 treating an exhaust gas from engine 7 through a reduction reaction, reducing agent tank 20 arranged forward of main valve 57 and storing reducing agent 90 to be supplied to exhaust gas treatment device 14, and partition plate 80 arranged between reducing agent tank 20 and main valve 57.

The hydraulic oil flowing in main valve 57 has a higher temperature than the outside air temperature. For example, when the outside air temperature is 40° C., the hydraulic oil may have its temperature increased to approximately 100° C. Therefore, the air in valve room 97 is heated by main valve 57 to accordingly flow and thereby cause convective heat transfer, and direct electromagnetic radiation from main valve 57 also causes radiative heat transfer to objects therearound. Meanwhile, reducing agent 90 stored in reducing agent tank 60 will be deteriorated if the temperature becomes higher. It is therefore necessary to suppress heat transfer to reducing agent 90 to prevent the temperature of reducing agent 90 from increasing. For example, in the case where reducing agent 90 is a urea solution, it is necessary to keep the temperature in tank room 40 at approximately 60° C. or lower.

Partition plate 80 can be arranged between reducing agent tank 20 and main valve 57 to thereby suppress radiative heat transfer from main valve 57 to reducing agent tank 20 and also suppress occurrence of convective heat transfer due to flow of the air heated by main valve 57 to a region around reducing agent tank 20. Since heat transfer to reducing agent tank 20 can be suppressed, deterioration, due to an increase in temperature, of reducing agent 90 stored in reducing agent tank 20 can be suppressed. Accordingly, reducing agent 90 can be supplied to exhaust gas treatment device 14 to appropriately treat the exhaust gas in exhaust gas treatment device 14.

As shown in FIGS. 4 and 7, partition plate 80 serves as a partition between tank room 92 housing reducing agent tank 20 and valve room 97 housing main valve 57. Partition plate 80 partitions tank room 92 and valve room 97 off from each other so that they are separate spaces, and partition plate 80 separates tank room 92 and valve room 97 from each other. Partition plate 80 forms a bulkhead between tank room 92 and valve room 97. Partition plate 80 can thus be structured to more reliably suppress heat transfer from main valve 57 to reducing agent tank 20.

Partition plate 80 is preferably arranged to extend across the whole space located rearward with respect to reducing agent tank 20 and forward with respect to main valve 57, so that communication between tank room 92 and valve room 97 is reduced to enable convective heat transfer to reducing agent tank 20 to be suppressed. Meanwhile, partition plate 80 is at least shaped and dimensioned so that main valve 57 is not seen, when the position where main valve 57 is installed is viewed from the position where reducing agent tank 20 is installed, due to partition plate 80 intervening therebetween. In this way, radiative heat transfer from main valve 57 to reducing agent tank 20 can be suppressed, which produces an effect that heat transfer to reducing agent tank 20 can be reduced.

In the case where partition plate 80 is separated from front cover 60 or revolving frame 31 and partition plate 80 is arranged to leave a gap between the partition plate and front cover 60 or revolving frame 31, it is preferable to provide a filler for filling the gap to further reduce communication between tank room 92 and valve room 97. More preferably, the filler is elastically deformable and capable of closely adhering to both partition plate 80 and front cover 60 or revolving frame 31 when filling the gap between partition plate 80 and front cover 60 or revolving frame 31. The filler may be a member made of a sponge-like rubber or resin, for example.

As shown in FIG. 4, of a wall portion defining tank room 92, only partition plate 80 is interposed between main valve 57 and reducing agent tank 20. Partition plate 80 is arranged rearward with respect to reducing agent tank 20, and main valve 57 and other devices which generate heat are not arranged forward and laterally with respect to reducing agent tank 20. The front side and the lateral side of the wall portion of tank room 92 are exposed outward of upper revolving unit 3 of hydraulic excavator 1 and thus exposed to the outside air.

Heat sources which may heat reducing agent 90 can be arranged only rearward with respect to reducing agent tank 20 and partition plate 80 can be arranged between reducing agent tank 20 and the heat sources to thereby effectively suppress heat transfer to reducing agent tank 20. In addition, tank room 92 is provided so that it is exposed to the outside air to thereby enable heat dissipation from reducing agent tank 20 to be promoted. Accordingly, deterioration of reducing agent 90 stored in reducing agent tank 20 can more reliably be suppressed.

As shown in FIG. 4, reducing agent tank 20 is arranged at a corner of tank room 92 as seen in a plan view, in a front portion in tank room 92. In this way, reducing agent tank 20 is arranged at a position away from partition plate 80 which forms the rear wall of tank room 92. Reducing agent tank 20 is thus located farther from main valve 57 to thereby enable further suppression of heat transfer from main valve 57 to reducing agent tank 20. Moreover, since reducing agent tank 20 is arranged at a position closer to the wall portion which defines tank room 92, heat dissipation from reducing agent tank 20 to the outside air can further be promoted.

As shown in FIG. 2, of the wall portion which defines tank room 92, left side plate 62 forming the left side of the wall portion has vent hole 69 formed therein. Vent hole 69 allows the inside and the outside of tank room 92 to communicate with each other. Vent hole 69 forms a communication hole allowing the inside and the outside of tank room 92 to communicate with each other. In this way, the outside air is allowed to flow into tank room 92 through vent hole 69 and the air in tank room 92 is allowed to flow to the outside therethrough, and therefore, heat dissipation from reducing agent tank 20 to the outside air can further be promoted.

Instead of or in addition to left side plate 62, front end plate 63 and/or exterior cover 61 of front cover 60 may have a communication hole formed therein for allowing the inside and the outside of tank room 92 to communicate with each other. The communication hole may be formed in at least one of the front side and the lateral side of the wall portion of tank room 92. The communication hole formed in the wall portion exposed to the outside air is preferable, since the communication hole can introduce into tank room 92 the fresh outside air having not been heated by heat sources and the temperature increase of reducing agent 90 can more reliably be suppressed.

Preferably, a plurality of communication holes are formed, since these holes can further promote flow of the air through tank room 92. More preferably, a plurality of communication holes in this case are formed in different sides of the wall portion which defines tank room 92. For example, communication holes may be formed in front end plate 63 and left side plate 62 of front cover 60, or communication holes may be formed in exterior cover 61 and left side plate 62.

As shown in FIG. 3, hydraulic excavator 1 further includes openable and closable exterior cover 61 which forms a part of a lateral side of the excavator's body. Exterior cover 61 in its closed state forms a lateral wall portion of tank room 92. As shown in FIG. 9, reducing agent tank 20 and main valve 57 are made accessible by opening of exterior cover 61. In this way, maintenance of reducing agent tank 20 and main valve 57 can easily be performed. For example, a replenishment port for replenishing reducing agent tank 20 with reducing agent 90 can be provided at a position which is to be exposed to the outside when exterior cover 61 is opened, to thereby enable easy replenishment with reducing agent 90.

As shown in FIG. 7, lower step plate 64 which forms the ceiling surface of tank room 92 is arranged lower than upper step plate 66 which forms the ceiling surface of valve room 97. Front cover 60 of hydraulic excavator 1 further includes vertical plate 65. Vertical plate 65 forms a coupling plate coupling the rear edge of lower step plate 64 and the front edge of upper step plate 66 to each other. Vertical plate 65 extends in the vertical direction. Partition plate 80 extends toward vertical plate 65.

If partition plate 80 which should be arranged between reducing agent tank 20 and main valve 57 is arranged in a space between revolving frame 31 and upper step plate 66 the area of partition plate 80 is larger because upper step plate 66 is located at a relatively higher position. Partition plate 80 can be arranged to extend toward vertical plate 65 as in the present embodiment or partition plate 80 can be arranged in a space between revolving frame 31 and lower step plate 64, to thereby reduce the cost for partition plate 80 since partition plate 80 having a smaller area can be used.

As shown in FIG. 7, hydraulic excavator 1 further includes a pump module including reducing agent pump 22 transferring the reducing agent, and support column 70 supporting the pump module. Partition plate 80 is secured to support column 70. Accordingly, it is unnecessary to specially provide a support structure for supporting and securing partition plate 80, and partition plate 80 can easily be attached with a simple structure.

It should be construed that the embodiment disclosed herein is given by way of illustration in all respects, not by way of limitation. It is intended that the scope of the present invention is defined by claims, not by the description above, and encompasses all modifications and variations equivalent in meaning and scope to the claims.

REFERENCE SIGNS LIST

1 hydraulic excavator; 4 work implement; 7 engine; 12, 14 exhaust gas treatment device; 13 intermediate connection pipe; 16 radiator; 17, 18 coolant pipe; 19 coolant pump; 20 reducing agent tank; 20s tank support; 21 supply pipe; 22 reducing agent pump; 23 return pipe; 25 delivery pipe; 28 injection nozzle; 31 revolving frame; 36 fuel tank; 36A, 38A tank cover; 38 hydraulic oil tank; 40 heat exchanger; 57 main valve; 57s valve support; 58 hydraulic cylinder; 60 front cover; 61 exterior cover; 61A handle; 61B hinge portion; 62 left side plate; 63 front end plate; 64 lower step plate; 65, 67 vertical plate; 66 upper step plate; 68 ceiling plate; 69 vent hole; 70 support column; 71 attachment portion; 72 base plate member; 80 partition plate; 81, 82 bent portion; 89 bolt; 90 reducing agent; 92 tank room; 97 valve room

The invention claimed is:

1. A hydraulic excavator comprising:
   a work implement;
   an engine;
   a main valve supplying a hydraulic oil to said work implement;
   an exhaust gas treatment device treating an exhaust gas from said engine through a reduction reaction;
   a reducing agent tank arranged at a forward side of said hydraulic excavator with respect to said main valve and storing a reducing agent to be supplied to said exhaust gas treatment device; and
   a partition plate arranged at a rearward side of said hydraulic excavator with respect to said reducing agent tank and at the forward side of said hydraulic excavator with respect to said main valve, said partition plate serving as a partition between a tank room housing said reducing agent tank and a valve room housing said main valve.

2. The hydraulic excavator according to claim 1, wherein of a wall portion defining said tank room, only said partition plate is interposed between said main valve and said reducing agent tank.

3. The hydraulic excavator according to claim 1, wherein said reducing agent tank is arranged at a corner of said tank room as seen in a plan view, in a front portion in said tank room.

4. The hydraulic excavator according to claim 1, wherein at least one of a front side and a lateral side of a wall portion defining said tank room has a communication hole formed for allowing an inside and an outside of said tank room to communicate with each other.

5. The hydraulic excavator according to claim 1, further comprising an openable and closable exterior cover forming a part of a lateral side of a body of the excavator, wherein
   said exterior cover in a closed state forms a lateral wall portion of said tank room, and
   said reducing agent tank and said main valve are made accessible by opening of said exterior cover.

6. The hydraulic excavator according to claim 1, wherein
   a ceiling surface of said tank room is lower than a ceiling surface of said valve room,
   said hydraulic excavator further comprises a coupling plate coupling a rear edge of the ceiling surface of said tank room and a front edge of the ceiling surface of said valve room to each other and extending in a vertical direction, and
   said partition plate extends toward said coupling plate.

7. The hydraulic excavator according to claim 1, further comprising:
   a pump module including a pump transferring said reducing agent; and
   a support column supporting said pump module, wherein said partition plate is secured to said support column.

* * * * *